US012631144B2

(12) United States Patent
Bifulco

(10) Patent No.: US 12,631,144 B2
(45) Date of Patent: *May 19, 2026

(54) CORE COMPARTMENT VENT DURING ENGINE SHUTDOWN TO REDUCED BOWED ROTOR START

(71) Applicant: RTX Corporation, Farmington, CT (US)

(72) Inventor: Anthony R. Bifulco, Ellington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/964,399

(22) Filed: Nov. 30, 2024

(65) Prior Publication Data

US 2025/0092826 A1     Mar. 20, 2025

Related U.S. Application Data

(62) Division of application No. 18/175,918, filed on Feb. 28, 2023, now Pat. No. 12,158,107.

(51) Int. Cl.
*F02C 7/18* (2006.01)
*F01D 21/06* (2006.01)

(52) U.S. Cl.
CPC .............. *F02C 7/18* (2013.01); *F01D 21/06* (2013.01); *F05D 2260/605* (2013.01); *F05D 2260/608* (2013.01)

(58) Field of Classification Search
CPC ..... F02C 7/18; F02K 1/38; F02K 1/28; F05D 2260/608; F05D 2260/605
See application file for complete search history.

(56) References Cited

U.S. PATENT DOCUMENTS

| | | | | |
|---|---|---|---|---|
| 10,427,632 B2 * | 10/2019 | Jackowski | .............. | F01D 25/26 |
| 11,047,306 B1 * | 6/2021 | Millhaem | ............. | F01D 17/105 |
| 2018/0149086 A1 | 5/2018 | Moniz et al. | | |
| 2018/0149093 A1 | 5/2018 | Moniz et al. | | |
| 2018/0229851 A1 * | 8/2018 | Joshi | ................... | B64D 35/025 |
| 2018/0283197 A1 | 10/2018 | Jackowski et al. | | |
| 2022/0355939 A1 | 11/2022 | Eryilmaz et al. | | |
| 2024/0287935 A1 | 8/2024 | Bifulco | | |

FOREIGN PATENT DOCUMENTS

FR     2955896 A1     8/2011

OTHER PUBLICATIONS

European Search Report for European Application No. 24160220.0; dated Jul. 24, 2024; 7 pages.

* cited by examiner

*Primary Examiner* — Katheryn A Malatek

(74) *Attorney, Agent, or Firm* — CANTOR COLBURN LLP

(57) ABSTRACT

A core section and nacelle assembly of a gas turbine engine includes a compressor located at an engine central longitudinal axis, a core case enclosing the compressor, and a nacelle located radially outboard of the core case and defining a core compartment between the nacelle and the core case. One or more vent openings are located in the nacelle to circulate a cooling airflow through the core compartment, and one or more fans are positioned at the one or more vent openings to urge the cooling airflow through the one or more vent openings to cool the core compartment.

7 Claims, 5 Drawing Sheets

CORE COMPARTMENT VENT DURING ENGINE SHUTDOWN TO REDUCED BOWED ROTOR START

CROSS-REFERENCE TO RELATED APPLICATIONS

This application is a division of U.S. application Ser. No. 18/175,918 filed Feb. 28, 2023, the disclosure of which is incorporated herein by reference in its entirety.

BACKGROUND

The subject matter disclosed herein generally relates to gas turbine engines and, more particularly, to a method and an apparatus for gas turbine engine system bowed rotor start mitigation and wear reduction.

Gas turbine engines are used in numerous applications, one of which is for providing thrust to an aircraft. Gas turbine engines are typically operated while the aircraft is on the ground, such as during taxiing from a gate prior to takeoff and taxiing back to the gate after landing. Gas turbine engines are typically operated at an idle level to warm engine subsystems, operate accessory subsystems, and keep the aircraft in a ready state. In some instances, on-ground operation at idle can be for extended periods of time, particularly at busy airports. The on-ground operation at idle can result in sustained periods of non-flight fuel burn and contributes to engine wear as well as associated operating noise, tire wear, brake wear, and fuel-burn emissions.

When the gas turbine engine of an airplane has been shut off for example, after an airplane has landed at an airport, the engine is hot and due to heat rise, the upper portions of the engine will be hotter than lower portions of the engine. When this occurs thermal expansion may cause deflection of components within the engine, which may result in a "bowed rotor" condition. If a gas turbine engine is in such a bowed rotor condition, it is undesirable to restart the engine. Engine start in this condition results in rub out of abradable and more open clearances, reducing compressor stability and performance.

The uneven nature of nacelle core compartment temperature results in a similar asymmetric temperature of the engine core cases. The core cases at top remaining hot while bottom structure begins to cool. This results in a level of case bow contributing to nonuniform compressor clearances.

BRIEF DESCRIPTION

In one embodiment, a core section and nacelle assembly of a gas turbine engine includes a compressor located at an engine central longitudinal axis, a core case enclosing the compressor, and a nacelle located radially outboard of the core case and defining a core compartment between the nacelle and the core case. One or more vent openings are located in the nacelle to circulate a cooling airflow through the core compartment, and one or more fans are positioned at the one or more vent openings to urge the cooling airflow through the one or more vent openings to cool the core compartment.

Additionally or alternatively, in this or other embodiments the one or more fans are positioned inside the nacelle at corresponding vent openings of the one or more vent openings.

Additionally or alternatively, in this or other embodiments a battery pack is operably connected to the one or more fans to power the one or more fans.

Additionally or alternatively, in this or other embodiments the one or more fans are operable to generate electrical power to recharge the battery pack.

Additionally or alternatively, in this or other embodiments the one or more vent openings are two vent openings positioned circumferentially 180 degrees apart relative to the engine central longitudinal axis.

Additionally or alternatively, in this or other embodiments the one or more vent openings are positioned at one or more of a core cowl, an inner fan duct or an upper bifurcation of the nacelle.

Additionally or alternatively, in this or other embodiments a first fan of the one or more fans is located at a first vent opening of the one or more vent openings and is configured to urge cooling airflow into the core compartment via the first vent opening, and a second fan of the one or more fans is located at a second vent opening of the one or mor event openings and is configured to urge cooling airflow out of the core compartment via the second vent opening.

Additionally or alternatively, in this or other embodiments a first fan of the one or more fans is positioned at a first vent opening of the one or more vent openings and is configured to urge cooling airflow out of the core compartment via the first vent opening, a second fan of the one or more fans is positioned at a second vent opening of the one or more event openings and is configured to urge cooling airflow out of the core compartment via the second vent opening.

Additionally or alternatively, in this or other embodiments the one or more fans are selectably operable only when operation of the gas turbine engine is stopped.

In another embodiment, a gas turbine engine includes a combustor to combust a mixture of fuel and air, a turbine located at and driven about an engine central longitudinal axis by gaseous products of the combustion, and a compressor driven by rotation of the turbine. A core case encloses the compressor, and a nacelle is located radially outboard of the core case and defines a core compartment between the nacelle and the core case. One or more vent openings are located in the nacelle to circulate a cooling airflow through the core compartment, and one or more fans are positioned at the one or more vent openings to urge the cooling airflow through the one or more vent openings to cool the core compartment.

Additionally or alternatively, in this or other embodiments the one or more fans are positioned inside the nacelle at corresponding vent openings of the one or more vent openings.

Additionally or alternatively, in this or other embodiments a battery pack is operably connected to the one or more fans to power the one or more fans.

Additionally or alternatively, in this or other embodiments the one or more fans are operable to generate electrical power to recharge the battery pack.

Additionally or alternatively, in this or other embodiments the one or more vent openings are two vent openings positioned circumferentially 180 degrees apart relative to the engine central longitudinal axis.

Additionally or alternatively, in this or other embodiments the one or more vent openings are positioned at one or more of a core cowl, an inner fan duct or an upper bifurcation of the nacelle.

Additionally or alternatively, in this or other embodiments a first fan of the one or more fans is positioned at a first vent opening of the one or more vent openings and is configured to urge cooling airflow into the core compartment via the first vent opening, and a second fan of the one or more fans is positioned at a second vent opening of the one or mor event openings and is configured to urge cooling airflow out of the core compartment via the second vent opening.

Additionally or alternatively, in this or other embodiments a first fan of the one or more fans is positioned at a first vent opening of the one or more vent openings and is configured to urge cooling airflow out of the core compartment via the first vent opening, and a second fan of the one or more fans is positioned at a second vent opening of the one or more event openings and is configured to urge cooling airflow out of the core compartment via the second vent opening.

Additionally or alternatively, in this or other embodiments the one or more fans are selectably operable only when operation of the gas turbine engine is stopped.

In yet another embodiment, a method of cooling a core section of a gas turbine engine includes providing one or more vent openings in a nacelle of a gas turbine engine, the nacelle enclosing a core section of the gas turbine engine including a core case enclosing at least a compressor. One or more fans are provided at each vent opening of the one or more vent openings, and the one or more fans are selectably operated to urge an airflow through the one or more vent openings to ventilate a core compartment defined between the nacelle and the core case. The core section is cooled via ventilation of the core compartment.

Additionally or alternatively, in this or other embodiments the one or more fans are operated only when operation of the gas turbine engine is stopped.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
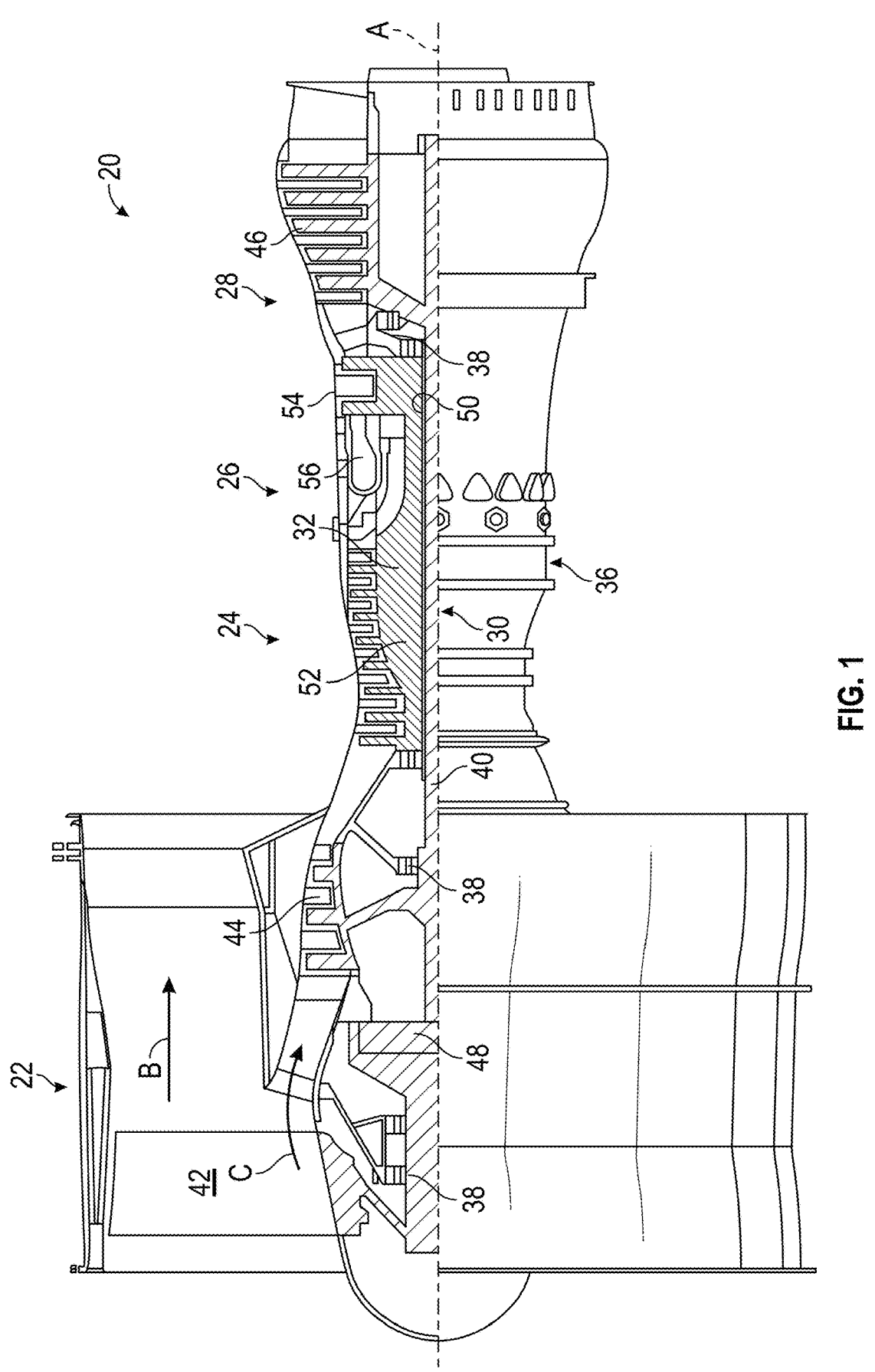
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7° R)] 0.5. The "Low corrected fan tip speed" as disclosed herein according to one non-limiting embodiment is less than about 1150 ft/second (350.5 m/sec).

Figure 2:
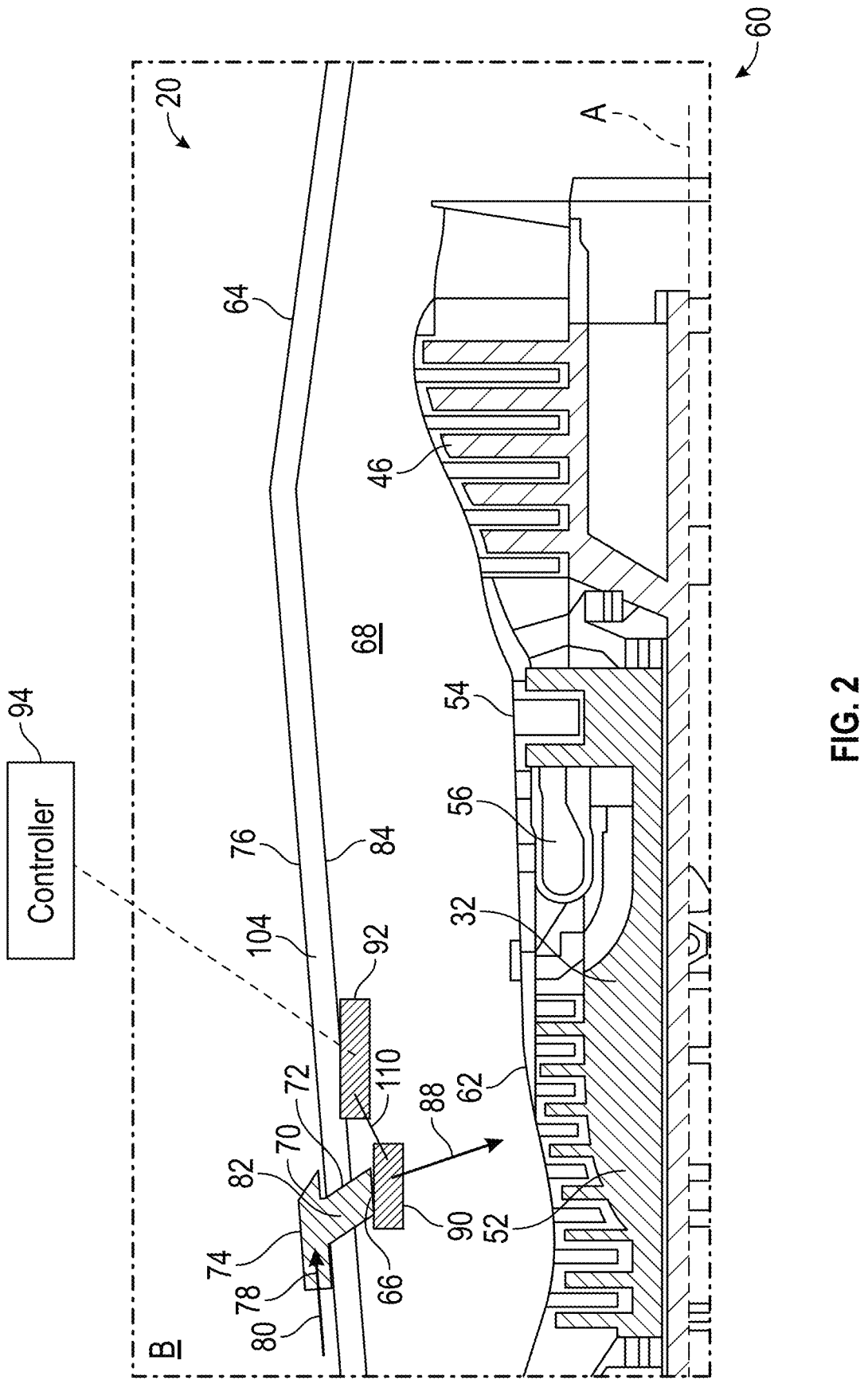
FIG. 2 is a partial cross-sectional view of an embodiment of a core section and nacelle assembly of a gas turbine engine.
Figure 2A:
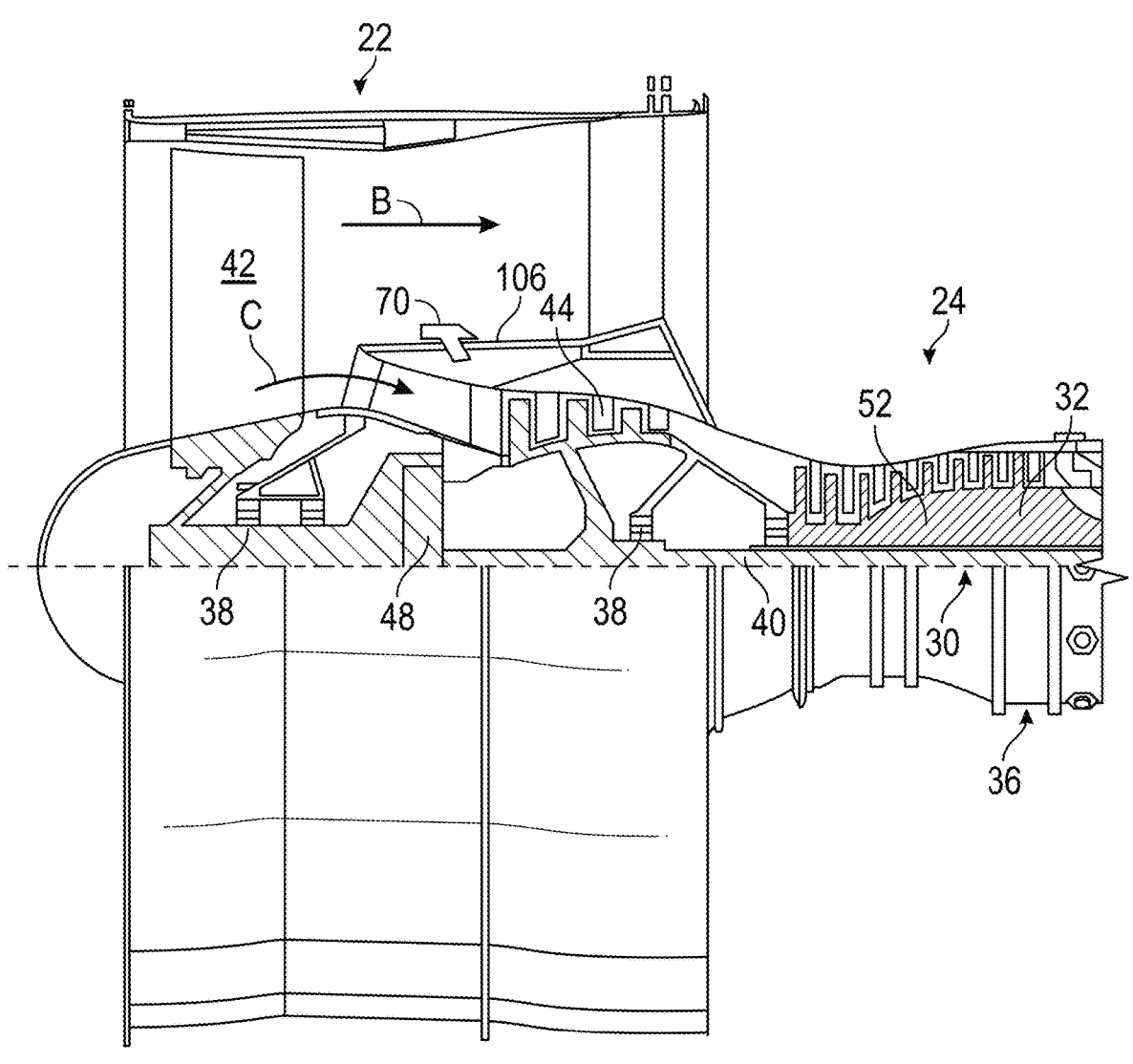
FIG. 2a is a partial cross-sectional view of another embodiment of a gas turbine engine.
Figure 2B:
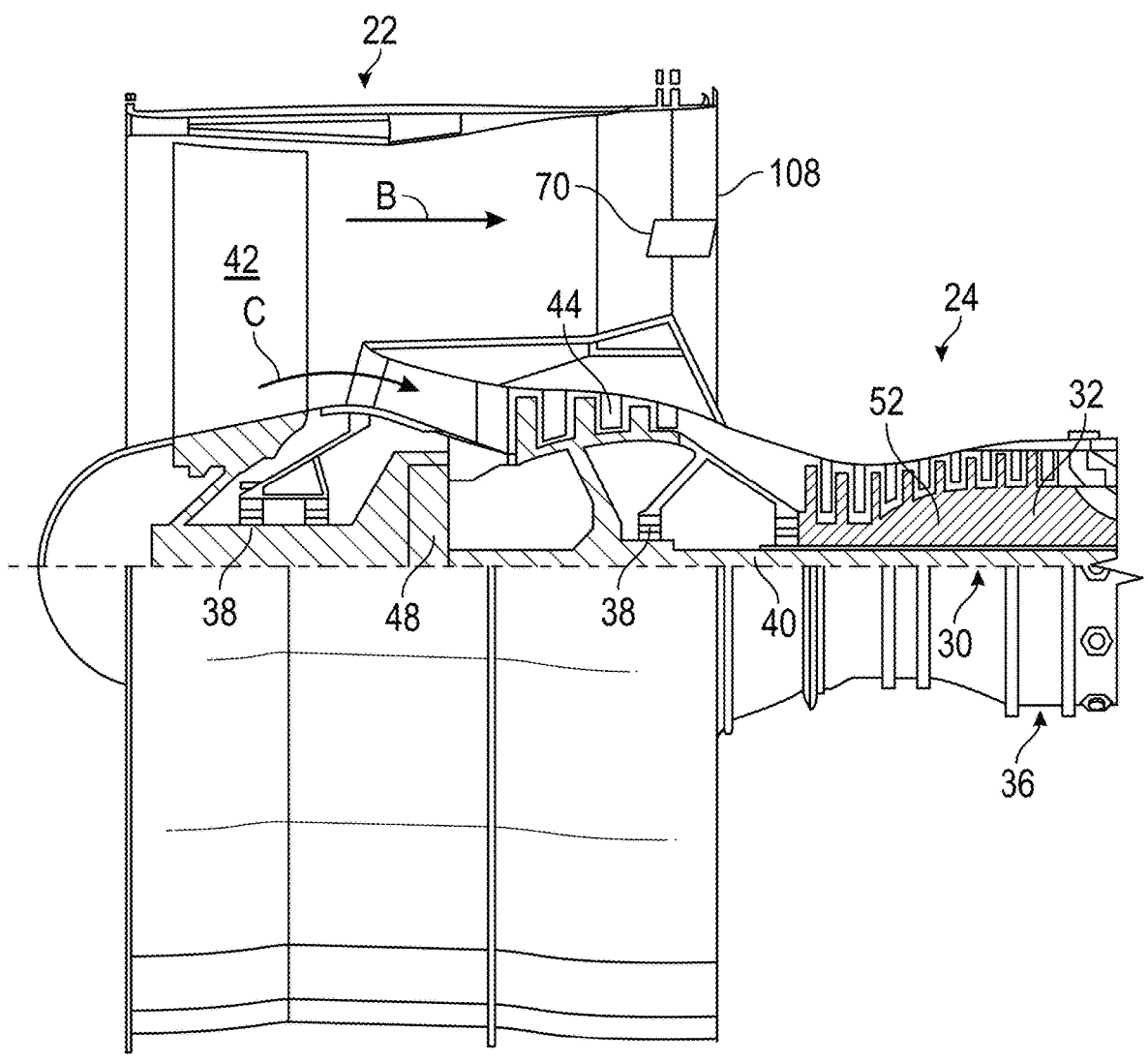
FIG. 2b is a partial cross-sectional view of yet another embodiment of a gas turbine engine.

Referring now to FIG. 2, a core portion 60 of the engine 20 is enclosed in a core case 62. In some embodiments, the core portion 60 includes the high pressure compressor 52 and the combustor 56, and in some embodiments also includes the high pressure turbine 54. A nacelle 64 of the engine 20 is disposed radially outboard of the core case 62 and encloses at least the core portion 60 of the engine 20. The nacelle 64 and the core case 62 define a core compartment 68 therebetween. The nacelle 64 includes features to cool the core compartment 68 when the engine 20 is in operation, since the core compartment 68 may otherwise accumulate heat which would be detrimental to performance of the engine 20. More particularly, one or more cooling scoops 70 are disposed in corresponding nacelle openings 72 in the nacelle 64. The cooling scoop 70 includes a scoop intake 74 that protrudes from an outer nacelle surface 76 into the bypass flow path B of the engine 20. The scoop intake 74 includes an inlet opening 78 through which a portion of the bypass airflow 80 from the bypass flow path B is flowed into the cooling scoop 70. The cooling scoop 70 further includes a scoop shaft 82 that extends through the nacelle 64 from the scoop intake 74 through an inner nacelle surface 84 of the nacelle 64 to a scoop outlet 66. During operation of the engine 20, the scoop intake 74 and the scoop shaft 82 define a cooling pathway 86 to direct the portion of bypass airflow 80 as a cooling airflow 88 into the core compartment 68 to cool the core compartment 68 and thereby cool the core case 62. While in the embodiment of FIG. 2 the cooling scoops 70 are located at a core cowl 104 portion of the nacelle 64, on other embodiments the cooling scoops 70 may additionally or alternatively be located at other locations of the nacelle 64. For example, as illustrated in FIG. 2a, the cooling scoops 70 may be located at an inner fan duct 106 or, as illustrated in FIG. 2b, the cooling scoops 70 may be located along an upper bifurcation 108.

When the engine 20 operation is stopped, the flow along the bypass flow path B is stopped, but it is still desired to cool the core case 68 to reduce the incidence of bowed rotor conditions when restarting. When engine 20 operation is stopped, the core case 62 tends to bow due at least in part to non-uniform temperature distribution in the core compartment 68. In a bowed rotor state, clearances between rotating airfoils of the high pressure compressor 52 and the core case 62 are non-uniform and results in interaction or rub of the rotating airfoils and the core case 62 at one or more circumferential locations around the core case 62. In the case of bow of the core case 62, these areas of rub are localized and result in areas of excess operating clearance between the high pressure compressor 52 and the core case 62. This excess operating clearance in turn causes excess leakage, performance loss and stability loss during operation of the engine 20.

As such, a fan 90 is disposed in the core compartment 68 at the scoop outlet 84 to circulate the cooling airflow 88 through the core compartment 68. In some embodiments, the fan 90 is powered by a power source, such as a rechargeable battery pack 92 operably connected to a fan motor 110 to drive rotation of the fan 90. Operation of the fan 90 may be controlled by a controller 94, which may initiate operation of the fan 90 based on commands received from, for example, the aircraft cockpit or from a switch outside of the nacelle that may be activated by ground service personnel. In other embodiments, the controller 94 may initiate operation of the fan 90 automatically or based on a command from an electronic engine control (EEC) of the engine 20 when the controller 94 detects that operation of the engine 20 has stopped. Further, in some embodiments, during normal operation of the engine 20, the bypass airflow B flows across the fan 90 urging rotation of the fan 90, which operates the fan motor 110 as a generator to generate electrical energy utilized to charge the battery pack 92, or alternatively for use by other engine 20 or aircraft systems or components. In some embodiments, the controller 94 may utilize programming or control circuits to stop this power generation when the battery pack 92 is fully charged.

Figure 3:
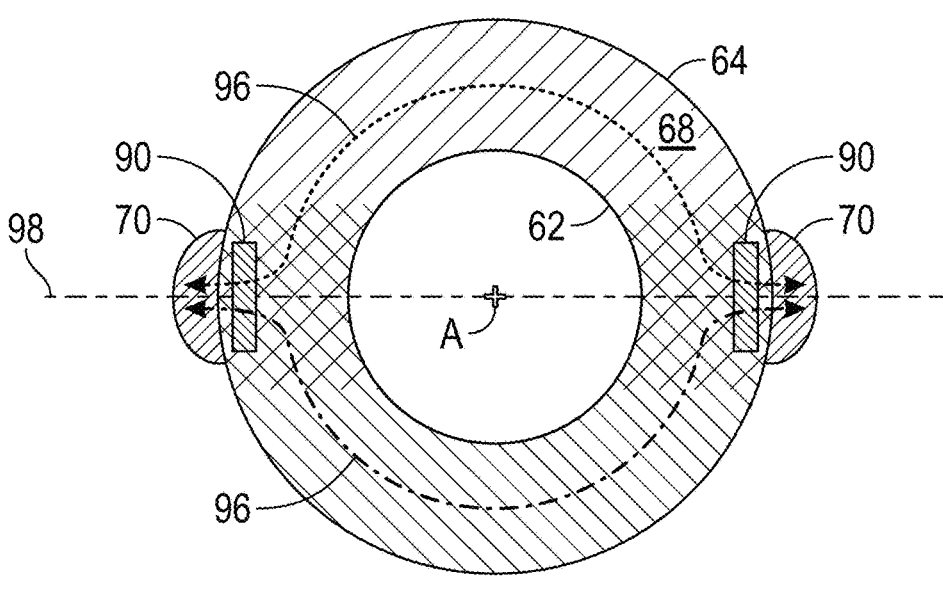
FIG. 3 is a cross-sectional view of an embodiment of a cooling arrangement for a core compartment of a gas turbine engine.

Referring now to FIG. 3, a plurality of cooling scoops 70 and corresponding fans 90 are arranged to vent core compartment airflow 96 from the core compartment 68 to outside of the nacelle 64. For example, in one embodiment illustrated in FIG. 3, cooling scoops 70, for example, two cooling scoops 70, are placed at or near a vertical horizon line 98 of the engine 20, and under engine stop conditions, fans 90 located at each cooling scoop 70 are configured to urge the core compartment airflow 96 out of the core compartment 68.

Figure 4:
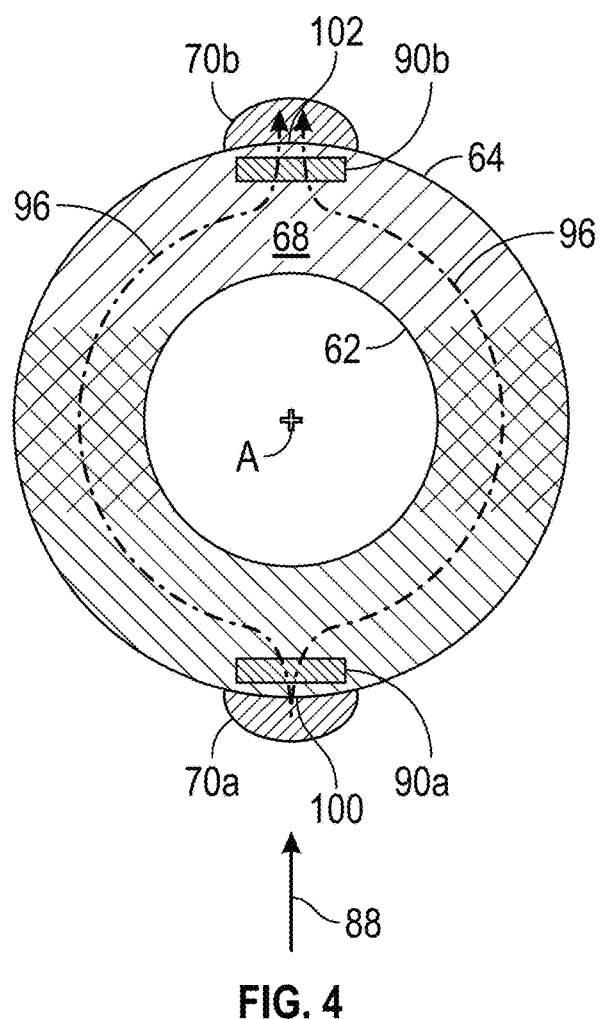
FIG. 4 is a cross-sectional view of another embodiment of a cooling arrangement for a core compartment of a gas turbine engine.

In other embodiments, such as illustrated in FIG. 4, the cooling scoops 70 and corresponding fans 90 are located and arranged to urge the cooling airflow 88 into the core compartment 68 via, for example, a first cooling scoop 70a, and vent core compartment airflow 96 from the core compartment 68 via a second cooling scoop 70b. A first fan 90a located at the first cooling scoop 70a is configured to urge cooling airflow 88 into the core compartment 68 via the first cooling scoop 70a, while a second fan 90b located at the second cooling scoop 70b is configured to direct core compartment airflow 96 outward through the second cooling scoop 70b to outside of the nacelle 64. In one illustrated embodiment, the first cooling scoop 70a is located at or near a vertical bottom 100 of the nacelle 64, and the second cooling scoop 70b is located at or near a vertical top 102 of the nacelle 64. Since after engine 20 shutdown, the heat gradient in the core compartment 68 is such that the air inside the core compartment 68 is hotter nearer the top of the core compartment 68, the configuration of the cooling scoops 70a, 70b and the corresponding fans 90a and 90b forces the hottest core compartment airflow 96 from the core compartment 68 via the second cooling scoop 70b, while urging cooler core compartment airflow 96 upward from nearer the vertical bottom of the core compartment 68 toward the vertical top of the core compartment 68. This has the effect of both cooling the core compartment 68 and equalizing a temperature distribution in the core compartment 68. This thereby reduces a thermal gradient between the vertical top and bottom of the core compartment 68 to reduce the incidence of bowed rotor conditions.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of cooling a core section of a gas turbine engine, comprising:
   providing one or more vent openings in a nacelle of the gas turbine engine, the nacelle enclosing the core section of the gas turbine engine including a core case enclosing at least a compressor;

providing one or more fans at each vent opening of the one or more vent openings;
   selectably operating the one or more fans to urge an airflow through the one or more vent openings to ventilate a core compartment defined between the nacelle and the core case; and
   cooling the core section via ventilation of the core compartment;
   wherein the one or more vent openings are one or more cooling scoops, each of the one or more cooling scoops including a scoop inlet having an scoop intake disposed at least partially across a bypass flowpath of the gas turbine engine.

2. The method of claim 1, further comprising operating the one or more fans only when operation of the gas turbine engine is stopped.

3. The method of claim 1, further comprising providing a battery pack operably connected to the one or more fans to power the one or more fans.

4. The method of claim 3, further comprising operating the one or more fans to generate electrical power to recharge the battery pack.

5. The method of claim 1, wherein the one or more vent openings are two vent openings disposed circumferentially 180 degrees apart relative to an engine central longitudinal axis.

6. The method of claim 1, wherein the one or more vent openings are disposed at one or more of a core cowl, an inner fan duct or an upper bifurcation of the nacelle.

7. The method of claim 1, further comprising:
   operating a first fan of the one or more fans disposed at a first vent opening of the one or more vent openings to urge cooling airflow out of the core compartment via the first vent opening; and
   operating a second fan of the one or more fans disposed at a second vent opening of the one or more event openings to urge cooling airflow out of the core compartment via the second vent opening.

* * * * *